United States Patent
Lin et al.

(10) Patent No.: US 7,502,415 B2
(45) Date of Patent: Mar. 10, 2009

(54) RANGE REDUCTION

(75) Inventors: Bruce Chih-Lung Lin, Redmond, WA (US); Pohsiang Hsu, Redmond, WA (US); Sridhar Srinivasan, Seattle, WA (US); Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 968 days.

(21) Appl. No.: 10/893,801

(22) Filed: Jul. 16, 2004

(65) Prior Publication Data

US 2005/0013373 A1    Jan. 20, 2005

Related U.S. Application Data

(60) Provisional application No. 60/488,710, filed on Jul. 18, 2003.

(51) Int. Cl.
*H04N 7/12* (2006.01)
*H04N 7/36* (2006.01)

(52) U.S. Cl. .................. 375/240.18; 348/416
(58) Field of Classification Search ................. 348/426, 348/261.2, 411, 412, 413, 414, 398, 402, 348/420.1, 719, 699, 397, 404, 405, 407, 348/416, 427, 443, 444; 382/248, 238, 250, 382/246, 260, 298, 299, 300, 233, 234, 236, 382/239, 251; 375/240.16, 240.12, 240.21, 375/240.17, 240.18, 240.19, 240.2, 240.25, 375/240.15
See application file for complete search history.

(56) References Cited

U.S. PATENT DOCUMENTS

| | | | |
|---|---|---|---|
| 5,465,118 A | 11/1995 | Hancock et al. | |
| 5,467,134 A | 11/1995 | Laney et al. | |
| 5,544,286 A | 8/1996 | Laney | |
| 5,611,038 A | 3/1997 | Shaw et al. | |
| 5,699,124 A * | 12/1997 | Nuber et al. | 348/465 |
| 5,737,023 A * | 4/1998 | Linzer | 375/240.15 |
| 5,970,173 A | 10/1999 | Lee et al. | |
| 6,256,347 B1 * | 7/2001 | Yu et al. | 375/240.13 |
| 6,259,810 B1 | 7/2001 | Gill et al. | |
| 6,389,071 B1 * | 5/2002 | Wilson | 375/240 |
| 6,483,938 B1 * | 11/2002 | Hennessey et al. | 382/149 |
| 6,519,288 B1 * | 2/2003 | Vetro et al. | 375/240.21 |

(Continued)

OTHER PUBLICATIONS

ISO/IEC 11172-2, "Coding of Moving Pictures and Associated Audio for Digital Storage Media at Up to About 1,5 Mbit/s, Part 2: Video," 122 pp. (1993).
ISO/IEC 14496-2, "Coding of Audio-Visual Objects: Visual, ISO/IEC 14496-2," 326 pp. (1998).
ITU-T Recommendation H.261, "Line Transmission of Non-Telephone Signals," International Telecommunication Union, 29 pp. (Mar. 1993).

(Continued)

*Primary Examiner*—Behrooz Senfi
(74) *Attorney, Agent, or Firm*—Klarquist Sparkman, LLP

(57) ABSTRACT

Techniques and tools are described for decoding video data having samples that have been scaled in the spatial domain. For example, a decoder receives a bit stream that includes coded video data for a current frame. The decoder processes at least one syntax element (e.g., sequence layer flag, frame layer flag) that indicates whether the current frame should be scaled up in value in a spatial domain. If so, then the samples for the current frame are scaled up in value in the spatial domain. As another example, for a reference frame used in motion compensation for a current frame, a decoder scales samples of the reference frame so the range of the reference frame matches the range of the current frame.

25 Claims, 7 Drawing Sheets

U.S. PATENT DOCUMENTS

| | | | |
|---|---|---|---|
| 6,606,418 | B2 | 8/2003 | Mitchell et al. |
| 6,778,711 | B2 * | 8/2004 | Morita ................... 382/299 |
| 6,831,951 | B2 | 12/2004 | Yamada |
| 7,242,717 | B2 * | 7/2007 | Li et al. ............. 375/240.18 |
| 2002/0009143 | A1 * | 1/2002 | Arye ................ 375/240.16 |
| 2002/0154693 | A1 | 10/2002 | Demos et al. |
| 2003/0044076 | A1 | 3/2003 | Mitchell et al. |
| 2004/0218678 | A1 * | 11/2004 | Tardif ............... 375/240.16 |
| 2005/0063471 | A1 | 3/2005 | Regunathan et al. |
| 2008/0019449 | A1 * | 1/2008 | Lin et al. ........... 375/240.18 |

OTHER PUBLICATIONS

ITU-T Recommendation H.262, "Transmission of Non-Telephone Signals," International Telecommunication Union, 216 pp. (Jul. 1995).

ITU-T Recommendation H.263, "Series H: Audiovisual and Multimedia Systems, Infrastructure of Audiovisual Services—Coding of Moving Video," International Telecommunication Union, 167 pp. (Feb. 1998).

Joint Video Team (JVT) of ISO/IEC MPEG and ITU-T VCEG, "Joint Committee Draft (CD)," JVT-C167, 3rd Meeting: Fairfax, Virginia, USA, 142 pp. (May 2002).

Microsoft Corporation, "Microsoft Debuts New Windows Media Player 9 Series, Redefining Digital Media on the PC, " 4 pp. (Sep. 4, 2002) [Downloaded from the World Wide Web on Jul. 16, 2004].

Mook, "Next-Gen Windows Media Player Leaks to the Web," BetaNews, 18 pp. (Jul. 2002) [Downloaded from the World Wide Web on Mar. 16, 2004].

Aaron, "Wyner-Ziv Coding of Motion Video," Information Systems Laboratory Stanford University, 11 pp. (last modified Nov. 7, 2002).

U.S. Appl. No. 60/341,674, filed Dec. 17, 2001, Lee et al.

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

U.S. Appl. No. 60/488,710, filed Jul. 18, 2003, Srinivasan et al.

U.S. Appl. No. 60/501,081, filed Sep. 7, 2003, Srinivasan et al.

Joint Video Team (JVT) of ISO/IEC MPEG & ITU-T VCEG, "Joint Final Committee Draft (JFCD) of Joint Video Specification," JVT-D157, 207 pp. (Aug. 2002).

Sullivan et al., "The H.264/AVC Advanced Video Coding Standard: Overview and Introduction to the Fidelity Range Extensions," 21 pp. (Aug. 2004).

Wien, "Variable Block-Size Transforms for Hybrid Video Coding," Dissertation, 182 pp. (Feb. 2004).

* cited by examiner

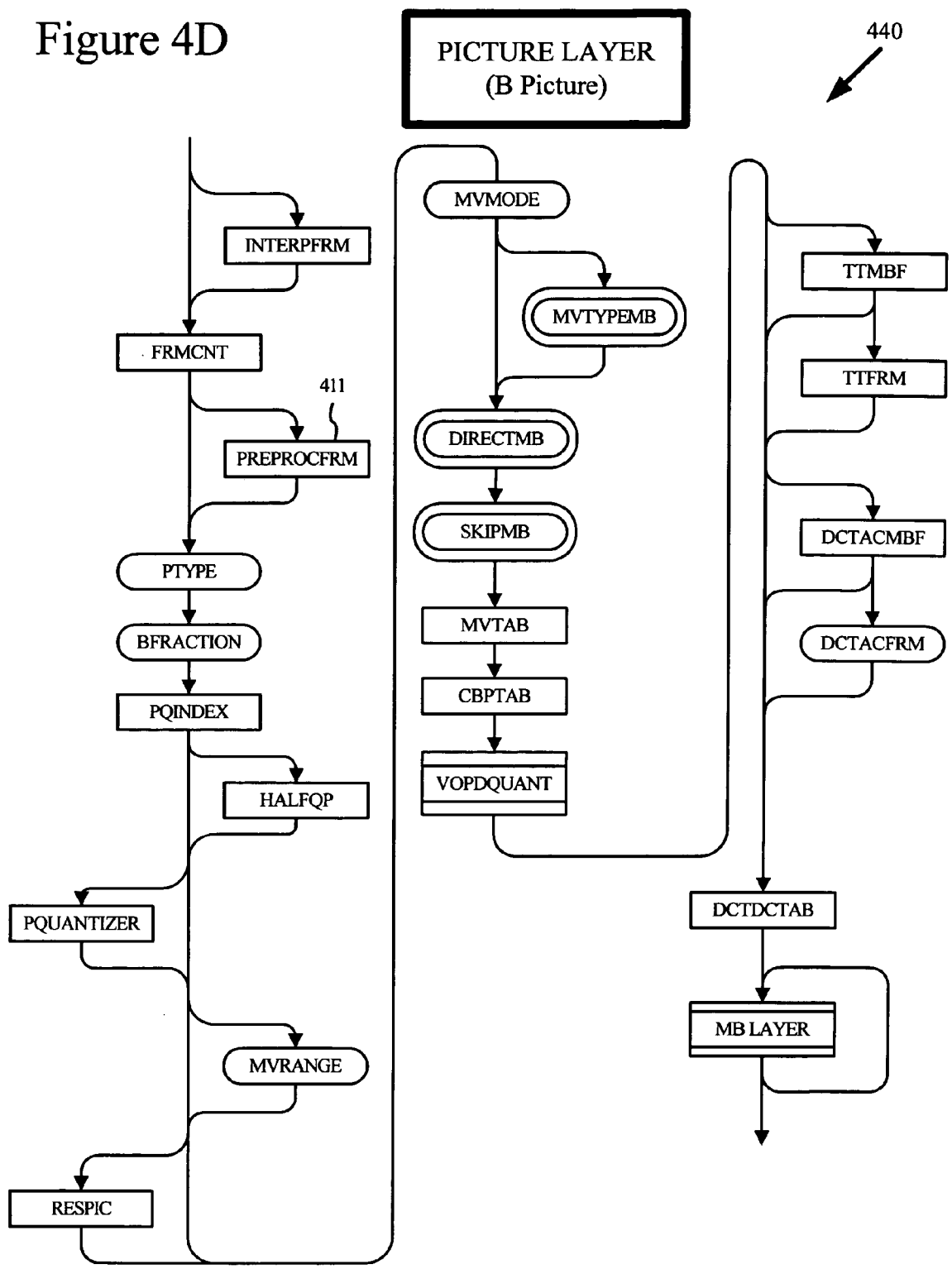

RANGE REDUCTION

RELATED APPLICATION INFORMATION

This application claims the benefit of U.S. Provisional Patent Application Ser. No. 60/488,710, filed Jul. 18, 2003, the disclosure of which is incorporated herein by reference.

TECHNICAL FIELD

Techniques and tools are described for decoding video data having samples that have been scaled in the spatial domain.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel as a set of three samples totaling 24 bits. For instance, a pixel may comprise an 8-bit luminance sample (also called a luma sample) that defines the grayscale component of the pixel and two 8-bit chrominance sample values (also called chroma samples) that define the color component of the pixel. Thus, the number of bits per second, or bit rate, of a typical raw digital video sequence may be 5 million bits per second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which quality of the video does not suffer, but decreases in the bit rate are limited by the inherent amount of variability (sometimes called entropy) of the video data. Or, compression can be lossy, in which quality of the video suffers, but achievable decreases in the bit rate are more dramatic. Lossy compression is often used in conjunction with lossless compression—in a system design in which the lossy compression establishes an approximation of information and lossless compression techniques are applied to represent the approximation.

In general, video compression techniques include "intra-picture" compression and "inter-picture" compression, where a picture is, for example, a progressively scanned video frame, an interlaced video frame (having alternating lines for video fields), or an interlaced video field. For progressive frames, intra-picture compression techniques compress individual frames (typically called I-frames or key frames), and inter-picture compression techniques compress frames (typically called predicted frames, P-frames, or B-frames) with reference to preceding and/or following frames (typically called reference or anchor frames).

A frame (or other video picture) is typically represented as one or more arrays of pixel samples. For example, a YCbCr, or YUV, video data frame is represented as three planes of samples: a luminance (Y) plane of luminance samples and two chrominance (U, V) planes of chrominance samples.

Often in video compression techniques, blocks of pixel or spatial domain video data are transformed into transform domain data, which is often frequency domain (i.e., spectral) data. The resulting blocks of spectral data coefficients may be quantized and then entropy encoded.

When the data is decompressed prior to the resulting video being displayed, a decoder typically performs the inverse of the compression operations. For example, a decoder may perform entropy decoding, inverse quantization, and an inverse transform while decompressing the data.

Numerous companies have produced video codecs. For example, Microsoft Corporation has produced a video encoder and decoder released for Windows Media Video 8. Aside from these products, numerous international standards specify aspects of video decoders and formats for compressed video information. These standards include the H.261, MPEG-1, H.262, H.263, and MPEG-4 standards. Directly or by implication, these standards also specify certain encoder details, but other encoder details are not specified. These products and standards use (or support the use of) different combinations of the compression and decompression techniques described above. In particular, these products and standards provide various techniques to trade-off quality and bitrate for video data, including adjusting quantization, adjusting resolution (i.e., dimensions) of pictures, and frame dropping (i.e., temporal scalability).

While the compression techniques implemented in these products (or in compliance with these standards) are effective in many scenarios, it may be desirable to compress video data further than is allowable by a particular compression technique. For example, an upper limit on a quantization factor may limit the amount of compression that can be achieved by quantization. Moreover, in practice, extreme forms of quality degradation associated with particular techniques often limit how far video data may be compressed with those techniques. For example, large quantization step sizes often result in visible distortions such as blocking or ringing in displayed images. Excessive frame dropping typically leads to choppy video on playback.

SUMMARY

The present invention relates to tools and techniques for preparing video data for display where at least some of the video data has been preprocessed by scaling or reducing the range of pixel samples in the spatial domain.

According to a first aspect of the tools and techniques, a decoder receives a bit stream that includes coded video data for a current frame in a transform domain. The video data for the current frame is decoded to produce a reconstructed current frame in the spatial domain. At least one syntax element indicates whether samples of the current frame should be scaled up in value in a spatial domain. If the syntax element(s) indicates that samples of the current frame should be scaled up in value in the spatial domain, then samples of the reconstructed current frame are scaled up in value in the spatial domain.

According to a second aspect of the tools and techniques, a decoder receives coded video data for a current frame. A determination is made as to whether the current frame has been range reduced in a pixel domain and whether a reference frame has been range-reduced in the pixel domain. If one but not both of the current frame and the reference frame have been range reduced, then the samples of the reference frame are scaled so that a range of the reference frame matches a range of the current frame. Finally, the current frame is reconstructed based at least in part on motion compensation from the reference frame.

Additional features and advantages will be made apparent from the following detailed description of various embodiments that proceeds with reference to the accompanying drawings.

BRIEF DESCRIPTION OF THE FIGURES

FIGS. 4A-4D show sequence and picture layers of an example bitstream syntax with syntax elements for signaling range reduction information.

DETAILED DESCRIPTION

Described embodiments relate to techniques and tools for decoding video data that has been scaled in the spatial domain, as well as techniques and tools for forming and parsing bitstreams that include such video data. The various techniques and tools can be used in combination or independently.

I. Computing Environment

Figure 1:
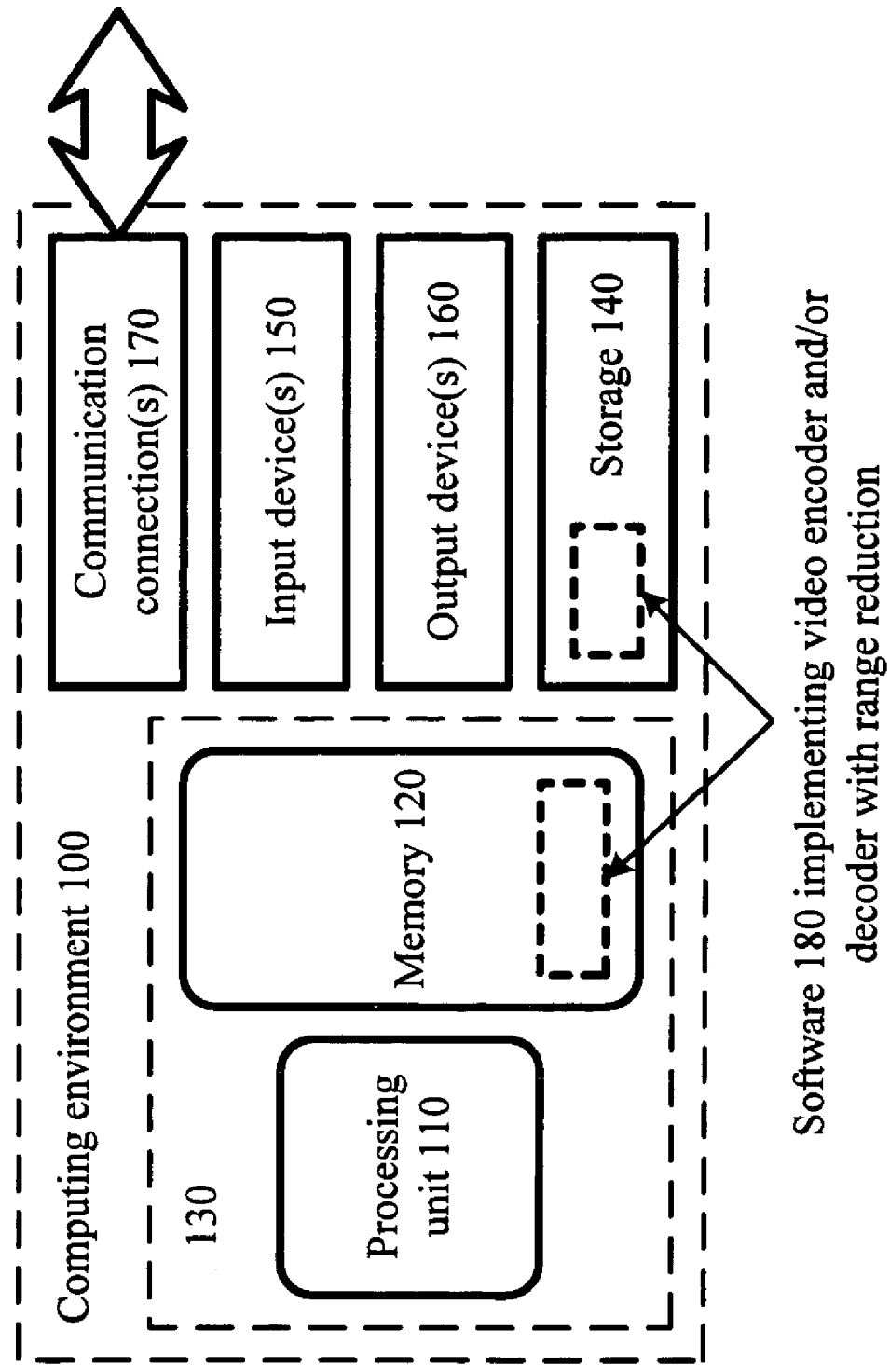
FIG. 1 is a block diagram of a suitable computing environment in which several described embodiments may be implemented.

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing an encoder and/or decoder, such as a video encoder and/or decoder, with range reduction.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing the encoder and/or decoder with range reduction.

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

II. Video Encoder and Decoder

Figure 2:
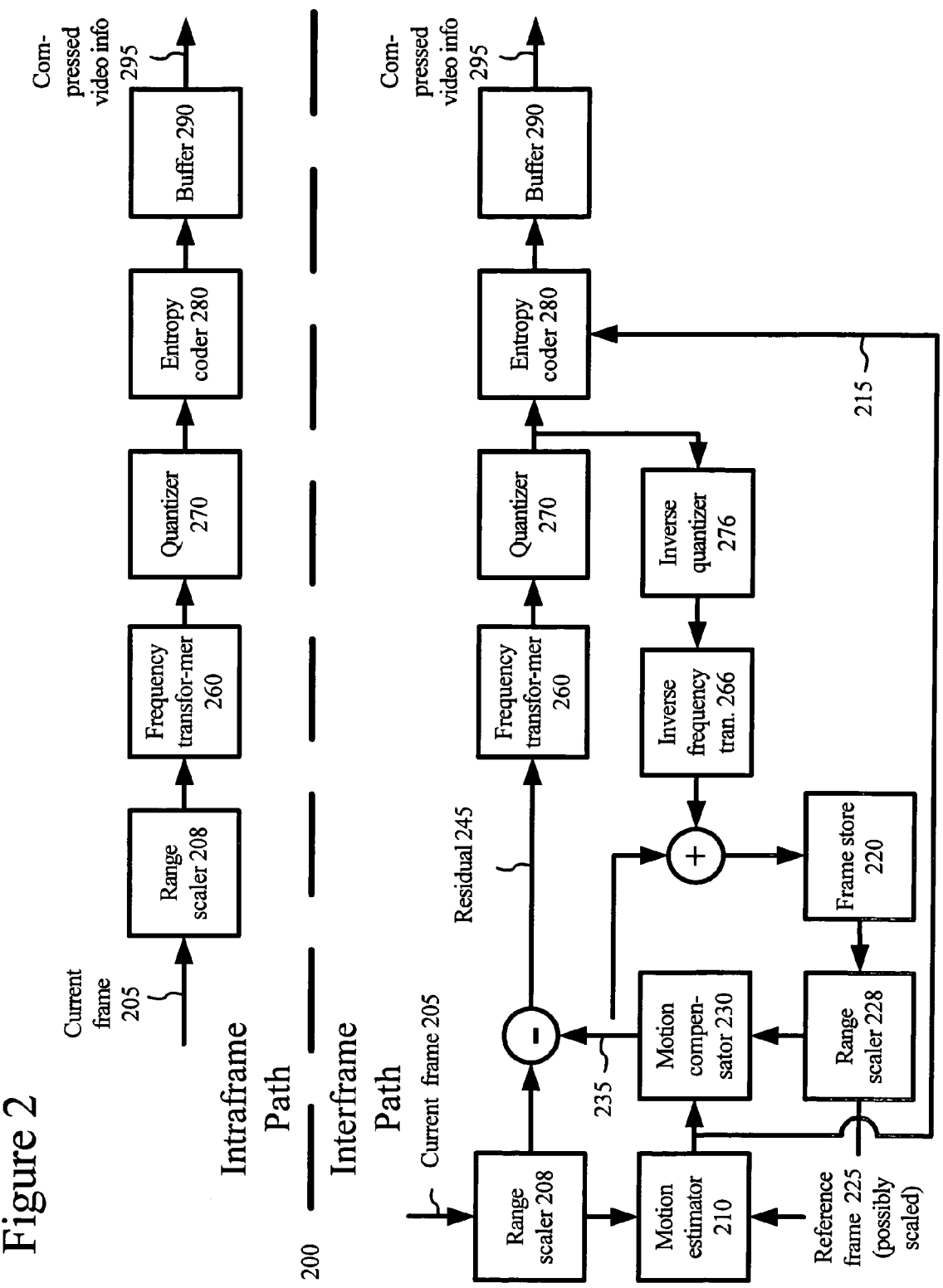
FIG. 2 is a block diagram of a video encoder system in conjunction with which several described embodiments may be implemented.
Figure 3:
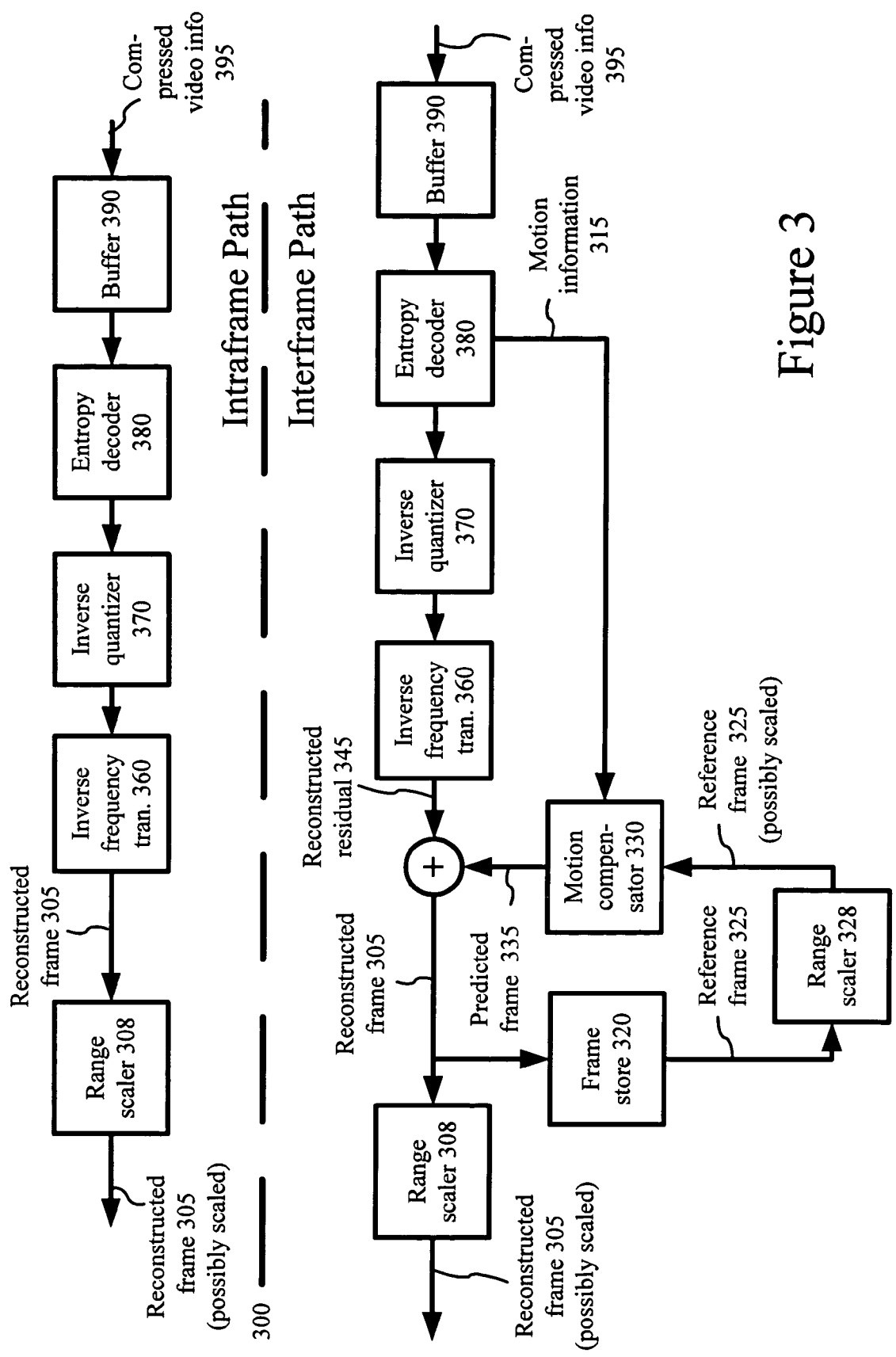
FIG. 3 is a block diagram of a video decoder system in conjunction with which several described embodiments may be implemented.

FIG. 2 is a block diagram of a generalized video encoder system (200), and FIG. 3 is a block diagram of a video decoder system (300), in conjunction with which various described embodiments may be implemented.

The relationships shown between modules within the encoder and decoder indicate the main flow of information in the encoder and decoder; other relationships are not shown for the sake of simplicity. In particular, FIGS. 2 and 3 usually do not show side information indicating the encoder settings, modes, tables, etc. used for a video sequence, frame, macroblock, block, etc. Such side information is sent in the output bit stream, typically after entropy encoding of the side information. The format of the output bit stream can be Windows Media Video version 9 format or another format.

The encoder (200) and decoder (300) are block-based and use a 4:2:0 macroblock format with each macroblock including 4 8×8 luminance blocks (at times treated as one 16×16 macroblock) and two 8×8 chrominance blocks. Alternatively, the encoder (200) and decoder (300) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 2 is a block diagram of a generalized video encoder system (200) that includes tools for pre-processing frames for range reduction and signaling when pre-processing range reduction is used for frames. The encoder (200) receives a sequence of video frames including a current frame (205), and produces compressed video information (295) as output. Particular embodiments of video encoders typically use a variation or supplemented version of the generalized encoder (200).

The encoder (200) compresses predicted frames and key frames. For the sake of presentation, FIG. 2 shows a path for key frames through the encoder (200) and a path for forward-predicted frames. Many of the components of the encoder (200) are used for compressing both key frames and predicted frames. The exact operations performed by those components can vary depending on the type of information being compressed.

A predicted frame (also called p-frame, b-frame for bi-directional prediction, or inter-coded frame) is represented in terms of prediction (or difference) from one or more other frames. A prediction residual is the difference between what was predicted and the original frame. In contrast, a key frame (also called i-frame, intra-coded frame) is compressed without reference to other frames.

For range reduction, the encoder (200) pre-processes the current frame (205) (shown as the range scaler (208)), producing scaled output that is processed by a decoder as described below. The encoder (200) produces side information (not shown in FIG. 2) indicating if and when pre-processing range reduction is used for a frame. For example, the encoder produces a sequence layer flag that indicates whether pre-processing range reduction is used for a sequence and, if pre-processing range reduction is used for the sequence, produces a picture layer signal per frame that indicates whether range reduction is used for that frame, as described with referenced the syntax diagrams below.

If the current frame (205) is a forward-predicted frame, a motion estimator (210) estimates motion of macroblocks or other sets of pixels of the current frame (205) with respect to a reference frame, which is the reconstructed previous frame (225) buffered in the frame store (220). In alternative embodiments, the reference frame is a later frame or the current frame is bi-directionally predicted. The motion estimator (210) can estimate motion by pixel, ½ pixel, ¼ pixel, or other increments, and can switch the resolution of the motion estimation on a frame-by-frame basis or other basis. The resolution of the motion estimation can be the same or different horizontally and vertically. The motion estimator (210) outputs as side motion information (215) such as motion vectors. A motion compensator (230) applies the motion information (215) to the reconstructed previous frame (225) to form a motion-compensated current frame (235). The prediction is rarely perfect, however, and the difference between the motion-compensated current frame (235) and the original current frame (205) is the prediction residual (245). Alternatively, a motion estimator and motion compensator apply another type of motion estimation/compensation.

A frequency transformer (260) converts the spatial domain video information into frequency domain (i.e., spectral) data. For block-based video frames, the frequency transformer (260) applies a discrete cosine transform ["DCT"] or variant of DCT to blocks of the pixel data or prediction residual data, producing blocks of DCT coefficients. Alternatively, the frequency transformer (260) applies another conventional frequency transform such as a Fourier transform or uses wavelet or sub band analysis. In embodiments in which the encoder uses spatial extrapolation (not shown in FIG. 2) to encode blocks of key frames, the frequency transformer (260) can apply a re-oriented frequency transform such as a skewed DCT to blocks of prediction residuals for the key frame. In other embodiments, the frequency transformer (260) applies an 8×8, 8×4, 4×8, or other size frequency transforms (e.g., DCT) to prediction residuals for predicted frames.

A quantizer (270) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (200) can use frame dropping, adaptive filtering, or other techniques for rate control.

If a given macroblock in a predicted frame has no information of certain types (e.g., no motion information for the macroblock and no residual information), the encoder (200) may encode the macroblock as a skipped macroblock. If so, the encoder signals the skipped macroblock in the output bit stream of compressed video information (295).

When a reconstructed current frame is needed for subsequent motion estimation/compensation, an inverse quantizer (276) performs inverse quantization on the quantized spectral data coefficients. An inverse frequency transformer (266) then performs the inverse of the operations of the frequency transformer (260), producing a reconstructed prediction residual (for a predicted frame) or a reconstructed key frame. If the current frame (205) was a key frame, the reconstructed key frame is taken as the reconstructed current frame (not shown). If the current frame (205) was a predicted frame, the reconstructed prediction residual is added to the motion-compensated current frame (235) to form the reconstructed current frame. The frame store (220) buffers the reconstructed current frame for use in predicting the next frame. When pre-processing range reduction is used for the next frame or the reconstructed current frame, the encoder (200) adjusts the range of the reconstructed frame if necessary (shown as range scaler (228)) to match the range of the next frame. This is also done in the motion compensation prediction loop in the decoder (300). In some embodiments, the encoder applies a deblocking filter to the reconstructed frame to adaptively smooth discontinuities in the blocks of the frame.

The entropy coder (280) compresses the output of the quantizer (270) as well as certain side information (e.g., motion information (215), spatial extrapolation modes, quantization step size). Typical entropy coding techniques include arithmetic coding, differential coding, Huffman coding, run length coding, LZ coding, dictionary coding, and combinations of the above. The entropy coder (280) typically uses different coding techniques for different kinds of information (e.g., DC coefficients, AC coefficients, different kinds of side information), and can choose from among multiple code tables within a particular coding technique.

The entropy coder (280) puts compressed video information (295) in the buffer (290). A buffer level indicator is fed back to bit rate adaptive modules.

The compressed video information (295) is depleted from the buffer (290) at a constant or relatively constant bit rate and stored for subsequent streaming at that bit rate. Therefore, the level of the buffer (290) is primarily a function of the entropy of the filtered, quantized video information, which affects the efficiency of the entropy coding. Alternatively, the encoder (200) streams compressed video information immediately following compression, and the level of the buffer (290) also depends on the rate at which information is depleted from the buffer (290) for transmission.

Before or after the buffer (290), the compressed video information (295) can be channel coded for transmission over the network. The channel coding can apply error detection and correction data to the compressed video information (295).

B. Video Decoder

FIG. 3 is a block diagram of a video decoder (300) that includes tools for processing range reduced frames. The decoder (300) receives information (395) for a compressed sequence of video frames and produces output including a current reconstructed frame (305).

The decoder (300) decompresses predicted frames and key frames. For the sake of presentation, FIG. 3 shows a path for key frames through the decoder (300) and a path for forward-predicted frames. Many of the components of the decoder (300) are used for compressing both key frames and predicted frames. The exact operations performed by those components can vary depending on the type of information being compressed.

A buffer (390) receives the information (395) for the compressed video sequence and makes the received information available to the entropy decoder (380). The buffer (390) typically receives the information at a rate that is fairly constant over time, and includes a jitter buffer to smooth short-term variations in bandwidth or transmission. The buffer (390) can include a playback buffer and other buffers as well. Alternatively, the buffer (390) receives information at a varying rate. Before or after the buffer (390), the compressed video information can be channel decoded and processed for error detection and correction.

The entropy decoder (380) entropy decodes entropy-coded quantized data as well as entropy-coded side information (e.g., motion information (315), spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (380) frequently uses different decoding techniques for different kinds of information (e.g., DC coefficients, AC coefficients, different kinds of side information), and can choose from among multiple code tables within a particular decoding technique.

If the frame (305) to be reconstructed is a forward-predicted frame, a motion compensator (330) applies motion information (315) to a reference frame (325) to form a prediction (335) of the current frame (305) being reconstructed. For example, the motion compensator (330) uses a macroblock motion vector to find a macroblock in the reference frame (325). A frame buffer (320) stores previous reconstructed frames for use as reference frames. The motion compensator (330) can compensate for motion at pixel, ½ pixel, ¼ pixel, or other increments, and can switch the resolution of the motion compensation on a frame-by-frame basis or other basis. The resolution of the motion compensation can be the same or different horizontally and vertically. Alternatively, a motion compensator applies another type of motion compensation. The prediction by the motion compensator is rarely perfect, so the decoder (300) also reconstructs prediction residuals (345).

When the decoder needs a reconstructed frame for subsequent motion compensation, the frame store (320) buffers the reconstructed frame for use in predicting the next frame. When pre-processing range reduction has been used for the next frame or the reconstructed current frame, the decoder (300) adjusts the range of the reconstructed frame if necessary (shown as range scaler (328)) to match the range of the next frame, as described in detail below. In some embodiments, the encoder applies a deblocking filter to the reconstructed frame to adaptively smooth discontinuities in the blocks of the frame.

An inverse quantizer (370) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (360) converts the quantized, frequency domain data into spatial domain video information. For block-based video frames, the inverse frequency transformer (360) applies an inverse DCT ["IDCT"] or variant of IDCT to blocks of the DCT coefficients, producing pixel data or prediction residual data for key frames or predicted frames, respectively. Alternatively, the frequency transformer (360) applies another conventional inverse frequency transform such as a Fourier transform or uses wavelet or sub band synthesis. In embodiments in which the decoder uses spatial extrapolation (not shown in FIG. 3) to decode blocks of key frames, the inverse frequency transformer (360) can apply a re-oriented inverse frequency transform such as a skewed IDCT to blocks of prediction residuals for the key frame. In other embodiments, the inverse frequency transformer (360) applies an 8×8, 8×4, 4×8, or other size inverse frequency transforms (e.g., IDCT) to prediction residuals for predicted frames.

For range reduction, the decoder (300) processes the range reduced current frame (305) (shown as the range scaler (308)), producing a scaled reconstructed frame (305), as described below. The decoder (300) processes side information such as a signal indicating when pre-processing range reduction is used for a frame. For example, the decoder processes syntax elements such as those described with referenced the syntax diagrams below.

III. Range Reduction

A decoder such as the decoder (300) shown in FIG. 3 is able to process frames that have been range reduced, or scaled down in the spatial domain. Alternatively, another decoder processes range reduced frames as described herein.

A. Range Reduction, Theory

With range reduction for video frames, the dynamic range of samples in input frames is reduced before compression, and the dynamic range of the samples is scaled back up to its original range for output. Such scaling in the spatial domain may be advantageous, for example, to further compress a frame beyond what is possible with particular quantization and entropy encoding techniques in the transform domain. For example, standards and products often limit the quantization step size that can be used, thereby effectively limiting the amount of compression that can be achieved by quantization. However, by reducing the range of the luminance and chrominance samples in the spatial domain prior to transforming the data, and also quantizing the data after it is transformed, a greater overall compression ratio can be achieved with the same range of quantizers.

Moreover, it has been found that using range reduction in conjunction with transform domain quantization can often achieve a higher subjective quality picture for a given bit rate than using transform quantization alone for that bit rate. This is especially true for many low bit rate applications. It is believed that this is the case because transform domain quantization often produces blocking artifacts and/or ringing artifacts when large step sizes are used. On the other hand, range reduction often produces blurring artifacts. While none of these artifacts are desirable, a displayed frame typically looks better with a combination of slight blurring and slight blocking/ringing than with severe blocking/ringing and no blurring. Additionally, it is believed that range reduction helps with bitrate control for high contrast video frames such as palletized video and ticker symbols. Range reduction may also provide other advantages.

B. Example Bitstream Syntax for Signaling Range Reduction

Figure 4A:
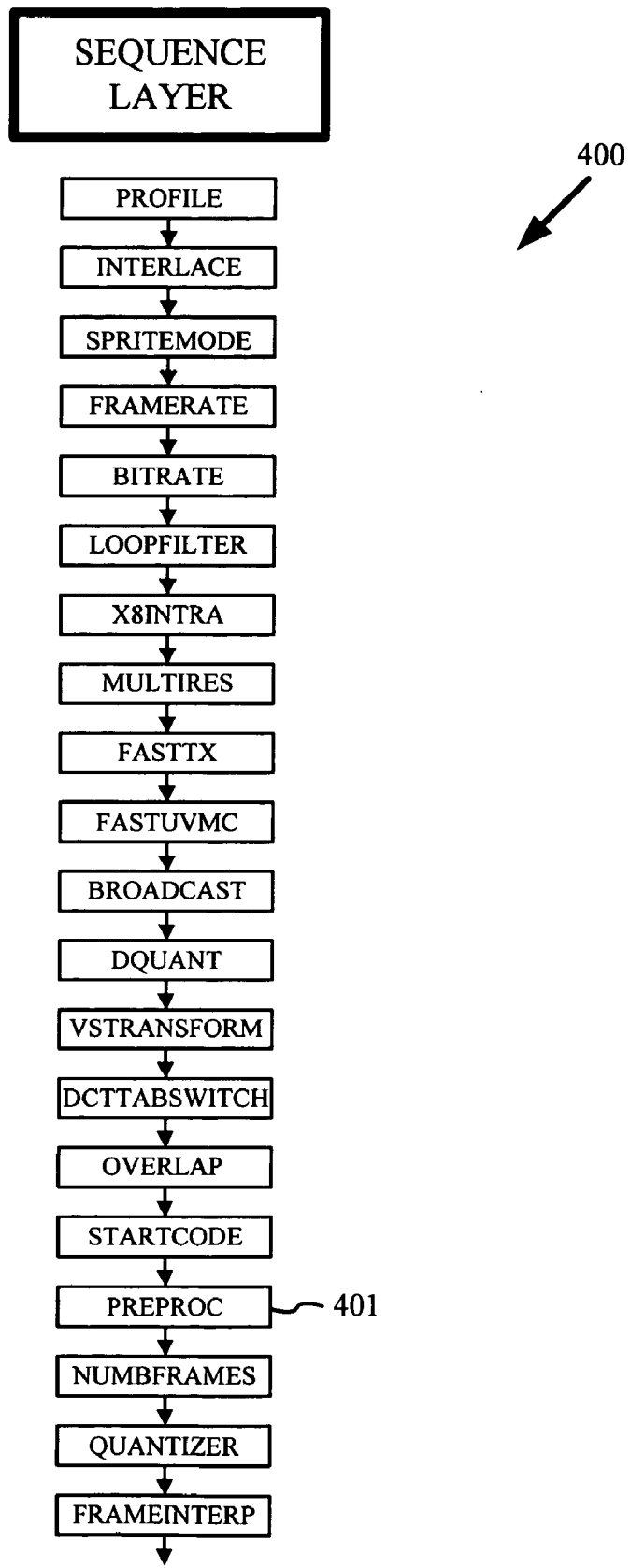
Figure 4B:
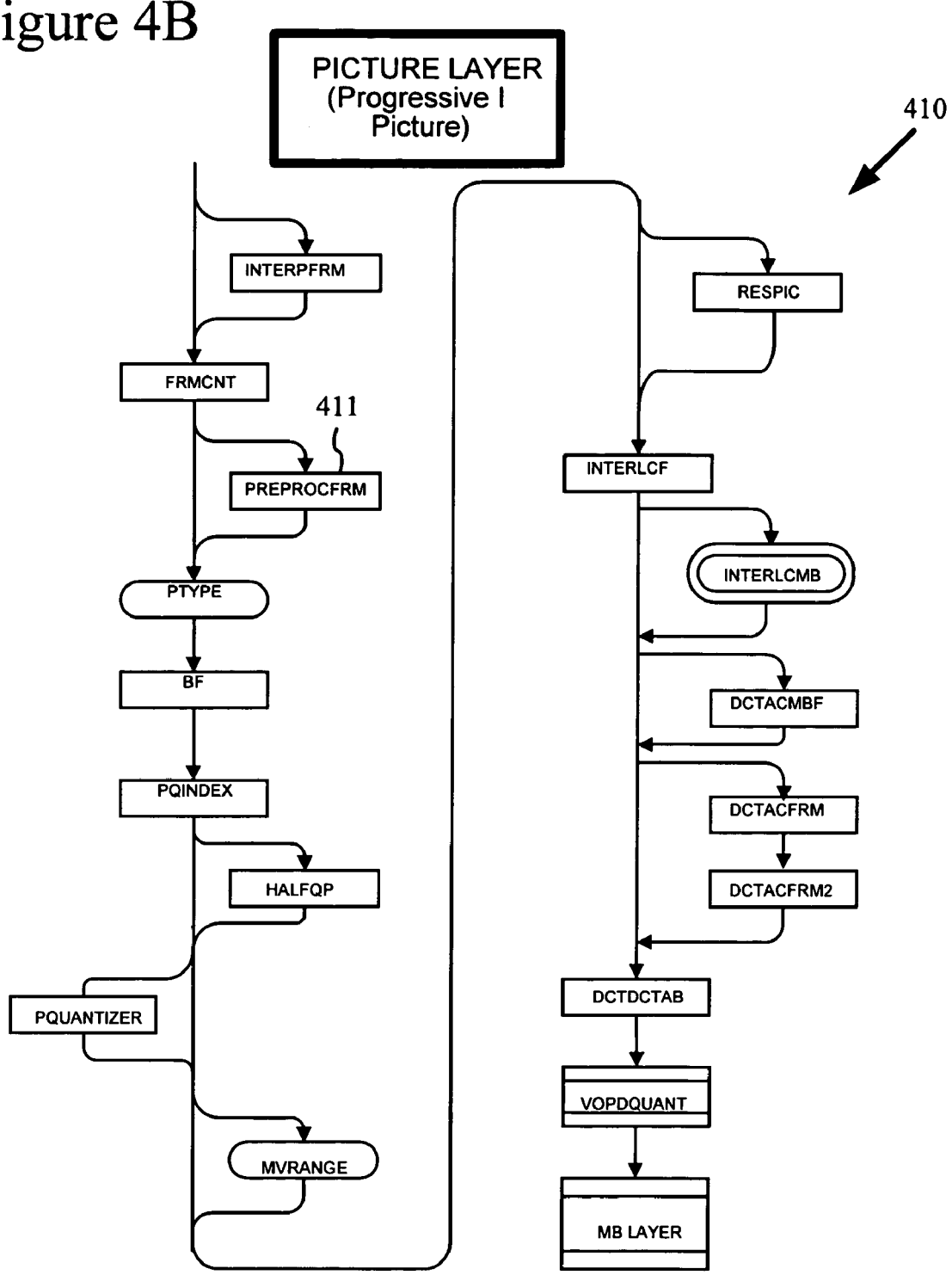
Figure 4C:
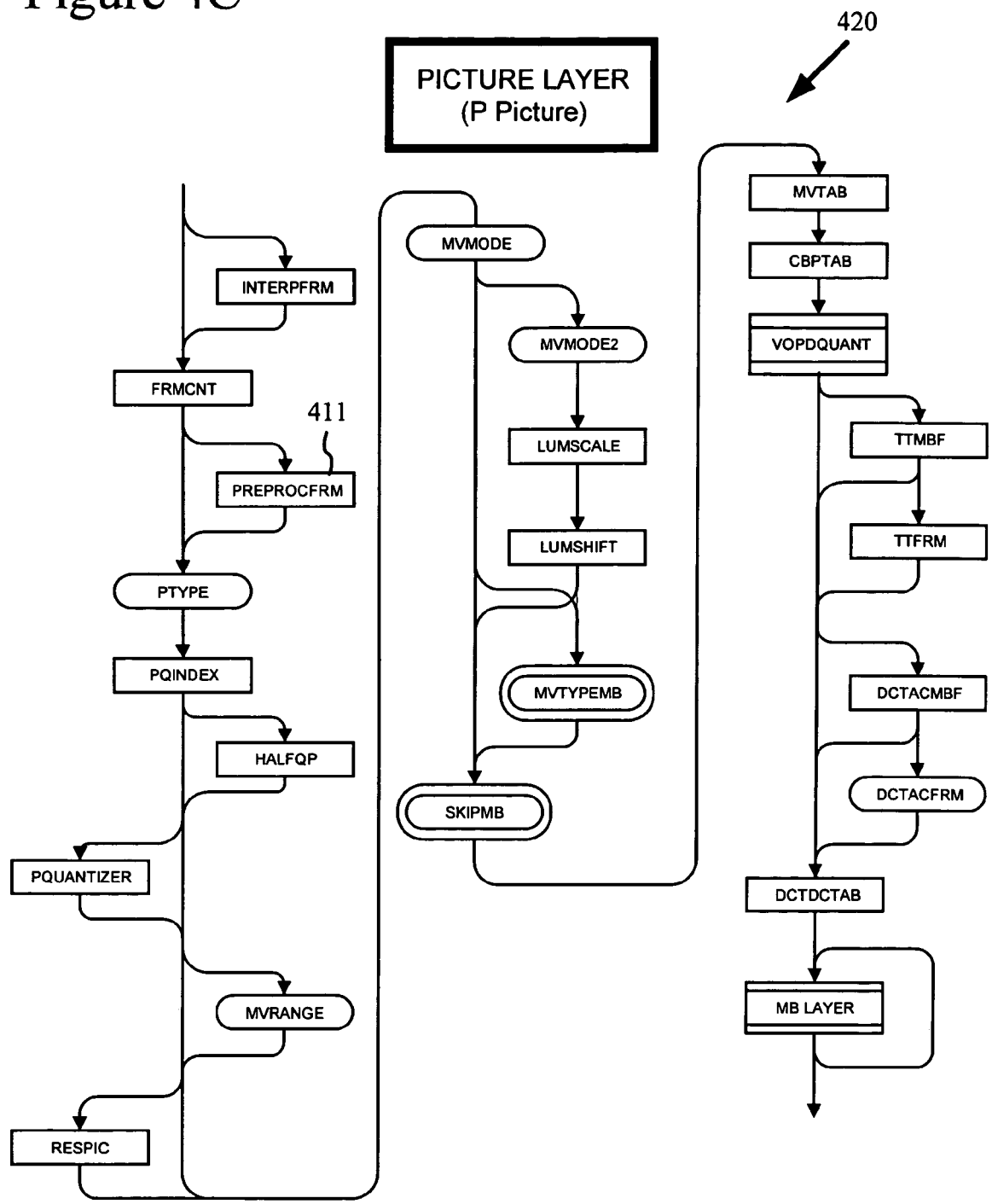

FIGS. 4A-4D show sequence and picture layers of an example bitstream syntax with syntax elements for signaling range reduction information. FIG. 4A is a sequence layer bitstream diagram (400) for a sequence. FIG. 4B is a picture layer bitstream diagram (410) for a I-frame, FIG. 4C is a picture layer bitstream diagram (420) for a P-frame, and FIG. 4D is a picture layer bitstream diagram (410) for a B-frame.

A header contains sequence-level parameters used to decode a sequence of compressed video frames. FIG. 4A shows the bitstream elements that make up the sequence layer header. In particular, the bitstream element PREPROC (401) is a 1-bit field that indicates whether preprocessing is used for the sequence of frames. If PREPROC=1 then there is a range reduction flag field in each frame header (PREPROCFRM). If PREPROC=0 then preprocessing is not used for any frame in the sequence. Other bitstream elements shown in FIG. 4A relate to other aspects of decoding.

A compressed video frame is made up of data structured into three hierarchical layers. From top to bottom the layers are: picture, macroblock, and block. FIGS. 4B-4D show the bitstream elements that make up the picture layer for a progressive I-frame, progressive P-frame, and progressive B-frame, respectively. In particular, the PREPROCFRM field (411) is a 1-bit field, or frame flag, present in all frame types (I-frames, P-frames, B-frames, etc.) if PREPROC=1. If PREPROCFRM=1 then range reduction is used for the frame. If PREPROCFRM=0 then range reduction is not used for the frame. Other bitstream elements shown in FIGS. 4B-4D relate to other aspects of decoding.

The PREPROC and PREPROCFRM elements, and range reduction generally in this implementation, may be used in certain functionality profiles for the decoder, but not used for other profiles. For example, they may be used in a simple profile but not a more complex profile. In addition, range reduction may be allowed for some types of pictures (such as progressive frames) but not for other types of pictures (such as interlaced frames).

C. Example Decoding Processes for Range Reduction

A specific implementation of range reduction for a decoder will now be described. This implementation works in conjunction with the bitstream signaling shown in FIGS. 4A-4D.

In this implementation, the frames are represented using pixel samples in the Y, U, and V planes within the range of 0 to 255 per sample. However, range reduction has been used for one or more of the frames. More specifically, range-reduced frames have been scaled down by a factor of two and mapped to a range of 64 to 191.

As noted above, the PREPROCFRM element is only present when PREPROC=1 at the sequence level. When PREPROCFRM signals that range reduction is used for a current frame (for example, an I-frame, P-frame), then the decoder scales up the current reconstructed frame prior to display. However, the decoder also stores intact the actual reconstructed frame (305) that has not been scaled up in value, for possible use in future motion compensation. For the following pseudo code, Y, U, and V denote the YUV planes of the output frame. The decoder scales up each of the samples in the Y, U, and V planes according to the following formulas:

$Y_p[n] = \text{CLIP}(((Y[n]-128)<<1)+128);$ $U_p[n] = \text{CLIP}(((U[n]-128)<<1)+128);$ $V_p[n] = \text{CLIP}(((V[n]-128)<<1)+128).$ Y[n], U[n], and V[n] represent the original values of the samples at different pixel locations in the Y, U, and V planes, respectively. $Y_p[n]$, $U_p[n]$, and $V_p[n]$ represent the scaled values of the samples in the Y, U, and V planes, respectively. CLIP(n) equals 255 if n>255 and 0 if n<0; otherwise, CLIP(n) equals n. The operator <<x is a bitwise operator for a left shift by x bits with zero fill, and with a twos complement number representation being assumed. As illustrated with the preceding equations, the same scaling parameters are applied to the luminance and chrominance components of a video frame.

For example, a range-reduced value of 64 would yield a scaled up, reconstructed value of zero. In binary, 64 is 01000000 and 128 is 10000000. 01000000-10000000 yields 11000000 for the least significant 8 bits, which when left shift by 1 yields 10000000. Adding 1000000 to this number results in 00000000 for the least significant 8 bits. A range-reduced value of 65 would yield a scaled up value of 2, and a range-reduced value of 191 would yield a scaled up value of 254. Thus, the operations represented by the above equations map the range-reduced values in the smaller range of 64 to 191 onto the larger range of 0 to 254 in steps of 2.

As a theoretical point, the above operations scale the reduced range values up by a factor of two, but keep the midpoint of the range at substantially 128. If range reduction by a factor of two is used, it is useful to map values between a larger range of 0 to N (such as 0 to 255) and a smaller range of about ¼ of N (such as 64) to about ¾ of N (such as 191), thereby keeping the midpoint at substantially the same number, about ½ of N (such as 128), for both ranges. Keeping the midpoint of the both ranges at 128 allows for re-use of various forms of prediction in the decoder, which have a default predictor value of 128.

As another theoretical point, range reduction to the range of 64 to 191 helps to integrate the range reduction into the lossy phases of the codec. More specifically, it is believed that the variance, energy, and other properties of the range reduced frame provide better results in the lossy phases than would be produced by other operations, such rounding the samples to the nearest even or odd number within the original range.

In addition, when a reference frame (such as a previous, reconstructed frame) is used for motion compensation, the decoder may scale it prior to using it for motion compensation. This would need to be done where the current frame and the reference frame are operating at different ranges. More specifically, in this implementation, there are two cases that require scaling the previous reconstructed frame.

First, if the current frame's PREPROCFRM field is signaled (i.e., equal to 1, indicating a range-reduced current frame) and the reference frame's PREPROCFRM field is not signaled, then the decoder scales down the reference frame prior to its use in motion compensation as follows:

$$Y_p[n]=((Y[n]-128)>>1)+128;$$

$$U_p[n]=((U[n]-128)>>1)+128;$$

$$V_p[n]=((V[n]-128)>>1)+128.$$

The operator >>x is a bitwise operator for shift right by x bits with sign extension, with twos complement number representation being assumed. Thus, values in the range of 0 to 255 are essentially scaled down by a factor of two and mapped onto a range of 64 to 191. This scaling down is substantially the inverse of the scaling up described above for range-reduced current frames for output.

Second, if the current frame's PREPROCFRM field is not signaled and the reference frame's PREPROCFRM field is signaled, then the decoder scales up the reference frame prior to its use in motion compensation as follows:

$$Y_p[n]=CLIP(((Y[n]-128)<<1)+128);$$

$$U_p[n]=CLIP(((U[n]-128)<<1)+128);$$

$$V_p[n]=CLIP(((V[n]-128)<<1)+128);$$

Of course, these equations are the same as for scaling up a current frame for output. Accordingly, an original value of 64 would yield a scaled value of zero, and an original value of 191 would yield a scaled value of 254.

The decoder performs the range reduction scaling operations to the reference frame, if necessary, before adjustments are made to the reference frame when intensity compensation is used.

D. Range Reduction in the Decoder of FIG. 3

This section describes the decoder (300) implementing range reduction as discussed in the previous sections. Specifically, if a sequence flag signals range reduction is used for the sequence of frames, the decoder (300) will parse flags at picture level for the respective frames to determine which frames are range-reduced frames.

When range reduction is used for the sequence, the decoder (300) processes a current frame's preprocessing flag to determine whether range reduction is signaled for the current frame (305). If the current frame's flag signals range reduction for the current frame (305), then a range scaler (308) scales the luminance (Y) and chrominance (U, V) planes of the reconstructed frame (305) before the reconstructed frame (305) is output. If either the sequence flag does not signal range reduction is used for the sequence of frames or if the current frame's flag does not signal range reduction for the current frame, then the reconstructed current frame (305) is not scaled by the range scaler (308).

Additionally, when motion compensation is used (e.g., for P-frames), if the sequence flag signals range reduction for the sequence of frames, then the decoder (300) determines whether range reduction is signaled for one of the current frame (305) and the reference frame (325) but not the other. If either (a) the current frame's flag signals range reduction for the current frame (305) and the reference frame's flag does not signal range reduction for the reference frame (325), or (b) the reference frame's flag signals range reduction for the reference frame (325) and the current frame's flag does not signal range reduction for the current frame (305), then the range scaler (328) scales the luminance (Y) and chrominance (U, V) planes of the reference frame (325) before the reference frame (325) is used by the motion compensator (330). Specifically, the range scaler (328) scales the reference frame (325) so that the range of the reference frame (325) matches the range of the current frame (305). The range scaler (340) does not scale the reference frame (325) if: (c) the reference frame's flag and the current frame's flag both signal range reduction; (d) neither the reference frame's flag nor the current frame's flag signal range reduction; or (e) the sequence flag does not signal range reduction for the sequence of frames.

Having described and illustrated the principles of our invention, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

We claim:

1. A computer-implemented method of using a video decoder to transform video from a compressed form to a reconstructed form, the method comprising:

receiving a bit stream at the video decoder, the bit stream comprising coded video data for a current frame in a transform domain;

with the video decoder, processing at least one syntax element that indicates whether samples of the current frame should be scaled up in value in a spatial domain;

with the video decoder, decoding the video data for the current frame to produce a reconstructed current frame in the spatial domain; and if the at least one syntax element indicates that the samples of the current frame should be scaled up in value in the spatial domain, then with the video decoder scaling up the samples of the reconstructed current frame, including mapping samples of at least one plane of the reconstructed current frame from a smaller range to a larger range, wherein the mapping comprises scaling original values in the smaller range to produce new values in the larger range as follows:

$$Y_p[n]=CLIP(((Y[n]-128)<<1)+128);$$

$$U_p[n]=CLIP(((U[n]-128)<<1)+128); \text{ and}$$

$$V_p[n]=CLIP(((V[n]-128)<<1)+128).$$

2. The method of claim 1, wherein the at least one syntax element comprises a sequence flag that indicates whether samples of any of a plurality of frames in a sequence should be scaled up in value in the spatial domain.

3. The method of claim 2, wherein the sequence flag is part of an initial sequence header for the bit stream.

4. The method of claim 2, wherein, if the sequence flag indicates that the samples of at least one of the plurality of frames should be scaled up in value in the spatial domain, then the at least one syntax element further comprises a current frame flag that indicates whether the samples of the current frame should be scaled up in value in the spatial domain.

5. The method of claim 4, wherein the current frame flag is part of a frame header for the current frame.

6. The method of claim 1, wherein a midpoint of the larger range is substantially the same as a midpoint of the smaller range.

7. The method of claim 1, wherein:
the larger range is from 0 to 255; and
the smaller range is from 64 to 191.

8. The method of claim 1, wherein the method further comprises, during the decoding, performing motion compensation for the current frame using video data for a reference frame, including:
matching a range of the current frame with a range of the reference frame; and
reconstructing the current frame based at least in part on the reference frame.

9. The method of claim 8, wherein matching the range of the current frame with the range of the reference frame comprises scaling samples of the reference frame.

10. A computer-implemented method of using a video decoder to transform video from a compressed form to a reconstructed form, the method comprising:
receiving coded video data in a bit stream at the video decoder, the video data comprising coded video data for a current frame;
with the video decoder, determining whether the current frame has been range-reduced in a pixel domain and whether a reference frame for the current frame has been range-reduced in the pixel domain;
with the video decoder, selectively performing motion compensation for the current frame using a range-reduced reference frame in the motion compensation, including, if the current frame but not the reference frame has been range-reduced, then scaling samples of the reference frame to reduce range of the reference frame such that the range of the reference frame matches range of the current frame and performing the motion compensation using the range-reduced reference frame after the scaling; and
with the video decoder, reconstructing the current frame based at least in part on the motion compensation from the reference frame.

11. The method of claim 10, wherein the determining comprises processing a sequence flag that indicates whether any frames of the sequence have been range-reduced in the pixel domain.

12. The method of claim 11, wherein the sequence flag is part of an initial sequence header for the bit stream.

13. The method of claim 10, wherein the determining comprises processing a current frame flag that indicates whether the current frame has been range-reduced in the pixel domain and processing a reference frame flag that indicates whether the reference frame has been range-reduced in the pixel domain.

14. The method of claim 13, wherein the reference frame flag is part of a frame header for the reference frame and the current frame flag is part of a frame header for the current frame.

15. The method of claim 10, wherein the scaling the samples of the reference frame comprises scaling down as follows:

$$Y_p[n]=((Y[n]-128)<<1)+128;$$

$$U_p[n]=((U[n]-128)<<1)+128; \text{ and}$$

$$V_p[n]=((V[n]-128)<<1)+128.$$

16. The method of claim 10, wherein the scaling the samples of the reference frame comprises scaling up as follows:

$$Y_p[n]=\text{CLIP}(((Y[n]-128)<<1)+128);$$

$$U_p[n]=\text{CLIP}(((U[n]-128)<<1)+128); \text{ and}$$

$$V_p[n]=\text{CLIP}(((V[n]-128)<<1)+128).$$

17. The method of claim 10, wherein reconstructing the current frame further comprises transforming the video data for the current frame from a transform domain to the pixel domain.

18. A computer-implemented method of using a video decoder to transform video from a compressed form to a reconstructed form, the method comprising:
with the video decoder, parsing a sequence layer syntax element that indicates whether range reduction is possible for a sequence of frames;
if the sequence layer syntax element indicates that range reduction is possible for the sequence of frames, then with the video decoder performing additional processing that allows the use of range reduction for the sequence of frames, wherein range reduction includes scaling samples from a larger range of sample values to a smaller range of sample values, and wherein the additional processing includes:
determining whether range reduction has been used for a current frame and whether range reduction has been used for a reference frame of the current frame;
if range reduction has been used for the current frame but not the reference frame, scaling samples of the reference frame down to reduce range prior to using the range-reduced reference frame in motion compensation for the range-reduced current frame; and
if the sequence layer syntax element indicates that range reduction is not possible for the sequence of frames, then with the video decoder skipping the additional processing that allows the use of range reduction for the sequence of frames.

19. The method of claim 18, further comprising with the video decoder parsing a picture level syntax element for the current frame if the sequence layer syntax element indicates that range reduction is possible for the sequence of frames, the picture level syntax element for the current frame indicating whether range reduction has been used for the current frame.

20. The method of claim 19, further comprising with the video decoder scaling up samples of the current frame after it has been decoded and prior to display only if the picture-level syntax element indicates that range reduction has been used for the current frame.

21. The method of claim 19, further comprising with the video decoder parsing a picture level syntax element for the reference frame, the picture level syntax element for the reference frame indicating whether range reduction has been used for the reference frame.

22. The method of claim 10 wherein the selectively performing motion compensation further includes:
if both of the current frame and the reference frame have been range-reduced, performing the motion compensation using the range-reduced reference frame.

23. The method of claim 18 wherein the additional processing further includes:
if range reduction has been used for the reference frame but not the current frame, scaling samples of the range-reduced reference frame up prior to using the scaled reference frame in motion compensation for the current frame;
if range reduction has been used for both the reference frame and the current frame, using the range-reduced reference frame in the motion compensation for the range-reduced current frame; and
if range reduction has not been used for the reference frame or the current frame, using the reference frame in the motion compensation for the current frame.

24. A computer-implemented method of using a video decoder to transform video from a compressed form to a reconstructed form, the method comprising:

receiving coded video data in a bit stream at the video decoder, the video data comprising coded video data for a current frame;

with the video decoder, determining whether the current frame has been range-reduced in a pixel domain and whether a reference frame for the current frame has been range-reduced in the pixel domain;

if one but not both of the current frame and reference frame have been range-reduced, then with the video decoder scaling samples of the reference frame such that a range of the reference frame matches a range of the current frame, wherein the scaling the samples of the reference frame comprises scaling down as follows:

$Y_p[n] = ((Y[n]-128)<<1)+128;$ $U_p[n] = ((U[n]-128)<<1)+128;$ and $V_p[n] = ((V[n]-128)<<1)+128;$ and with the video decoder, reconstructing the current frame based at least in part on motion compensation from the reference frame.

25. A computer-implemented method of using a video decoder to transform video from a compressed form to a reconstructed form, the method comprising:

receiving coded video data in a bit stream at the video decoder, the video data comprising coded video data for a current frame;

with the video decoder, determining whether the current frame has been range-reduced in a pixel domain and whether a reference frame for the current frame has been range-reduced in the pixel domain;

if one but not both of the current frame and reference frame have been range-reduced, then with the video decoder scaling samples of the reference frame such that a range of the reference frame matches a range of the current frame, wherein the scaling the samples of the reference frame comprises scaling up as follows:

$Y_p[n] = \text{CLIP}(((Y[n]-128)<<1)+128);$ $U_p[n] = \text{CLIP}(((U[n]-128)<<1)+128);$ and $V_p[n] = \text{CLIP}(((V[n]-128)<<1)+128);$ and with the video decoder, reconstructing the current frame based at least in part on motion compensation from the reference frame.

* * * * *

UNITED STATES PATENT AND TRADEMARK OFFICE
CERTIFICATE OF CORRECTION

PATENT NO. : 7,502,415 B2
APPLICATION NO. : 10/893801
DATED : March 10, 2009
INVENTOR(S) : Bruce Chih-Lung Lin et al.

Page 1 of 1

It is certified that error appears in the above-identified patent and that said Letters Patent is hereby corrected as shown below:

In column 13, line 55-59, in Claim 15,
delete "$Y_p[n]=((Y[n]-128)<<1)+128$;
$U_p[n]=((U[n]-128)<<1)+128$; and
$V_p[n]=((V[n]-128)<<1)+128$" and
insert -- $Y_p[n]=((Y[n]-128)>>1)+128$;
$U_p[n]=((U[n]-128)>>1)+128$; and
$V_p[n]=((V[n]-128)>>1)+128$ --, therefor.

In column 15, line 18-22, in Claim 24,
delete "$Y_p[n]=((Y[n]-128)<<1)+128$;
$U_p[n]=((U[n]-128)<<1)+128$; and
$V_p[n]=((V[n]-128)<<l)+128$" and
insert -- $Y_p[n]=((Y[n]-128)>>1)+128$;
$U_p[n]=((U[n]-128)>>1)+128$; and
$V_p[n]=((V[n]-128)>>1)+128$ --, therefor.

Signed and Sealed this
Twenty-sixth Day of April, 2011

David J. Kappos
*Director of the United States Patent and Trademark Office*